United States Patent
Mordon et al.

(10) Patent No.: US 10,401,567 B2
(45) Date of Patent: Sep. 3, 2019

(54) OPTICAL FIBER MODE SCRAMBLER

(71) Applicants: INSERM (INSTITUT NATIONAL DE LA SANTE ET DE LA RECHERCHE MEDICALE), Paris (FR); UNIVERSITE DE LILLE 2 DROIT ET SANTE, Lille (FR); CENTRE HOSPITALIER REGIONAL ET UNIVERSITAIRE DE LILLE (CHRU), Lille (FR)

(72) Inventors: Serge Mordon, Lille (FR); Pascal Delepôrte, Lille (FR); Nacim Betrouni, Lille (FR)

(73) Assignees: INSERM ( INSTITUT NATIONAL DE LA SANTE ET DE LA RECHERCHE MEDICALE), Paris (FR); UNIVERSITÉ DE LILLE, Lille (FR); CENTRE HOSPITALIER REGIONAL ET UNIVERSITAIRE DE LILLE (CHRU), Lille (FR)

( * ) Notice: Subject to any disclaimer, the term of this patent is extended or adjusted under 35 U.S.C. 154(b) by 0 days.

(21) Appl. No.: 16/074,937

(22) PCT Filed: Feb. 3, 2017

(86) PCT No.: PCT/EP2017/052328
§ 371 (c)(1),
(2) Date: Aug. 2, 2018

(87) PCT Pub. No.: WO2017/134194
PCT Pub. Date: Aug. 10, 2017

(65) Prior Publication Data
US 2019/0033525 A1 Jan. 31, 2019

(30) Foreign Application Priority Data

Feb. 5, 2016 (EP) ..................................... 16305141

(51) Int. Cl.
*G02B 6/02* (2006.01)
*G02B 6/14* (2006.01)
*H04B 10/2581* (2013.01)

(52) U.S. Cl.
CPC ........... *G02B 6/14* (2013.01); *H04B 10/2581* (2013.01)

(58) Field of Classification Search
CPC .............................. G02B 6/14; H04B 10/2581
See application file for complete search history.

(56) References Cited

U.S. PATENT DOCUMENTS

| 4,877,305 A | 10/1989 | Ricciardelli |
| 5,159,481 A * | 10/1992 | Maeda ............... H04B 10/2581 385/11 |

(Continued)

FOREIGN PATENT DOCUMENTS

| EP | 0 535 441 A1 | 4/1993 |
| EP | 0 899 834 A1 | 3/1999 |
| JP | H02 163707 A | 6/1990 |

*Primary Examiner* — Ellen E Kim
(74) *Attorney, Agent, or Firm* — W&C IP

(57) ABSTRACT

An optical fiber mode scrambler adapted to give a determined bending to an optical fiber inserted in the mode scrambler, the mode scrambler having a general extension direction X, the mode scrambler having a morphology adapted to give the optical fiber a direction along X at the entry of the scrambler, and then to bend the fiber to bring the fiber substantially in the X, Y plan in the −X and Y directions, before bringing the fiber in a rotation around the X axis substantially in the Y, Z plan in the anti clockwise direction for one full rotation, and then bending the fiber to bring the fiber substantially in the X, Y plan in the −X and −Y directions, and then bending the fiber to give the optical fiber a direction along X at the exit of the scrambler.

15 Claims, 4 Drawing Sheets

(56) References Cited

U.S. PATENT DOCUMENTS

| | | | | |
|---|---|---|---|---|
| 6,466,728 B1 * | 10/2002 | Radloff | ............... | G02B 6/266 |
| | | | | 385/134 |
| 9,036,137 B2 * | 5/2015 | Goldstein | ............ | G01M 11/088 |
| | | | | 356/73.1 |
| 10,018,785 B2 * | 7/2018 | Fortin | ............... | G02B 6/0281 |
| 2006/0222305 A1 | 10/2006 | Crownover | | |
| 2013/0293874 A1 * | 11/2013 | Goldstein | ............ | G01M 11/088 |
| | | | | 356/73.1 |

* cited by examiner

OPTICAL FIBER MODE SCRAMBLER

BACKGROUND OF THE INVENTION

The prior art document US2006/0222305 describes a helical optical fiber mode scrambler. The three-dimensional spiral curvature given to the optical fiber induces mode coupling in the optical fiber, to improve the uniformity of the light intensity at the output. However, the light signal at the output of the fiber using this mode scrambler is still inhomogeneous. Moreover, the helical optical fiber mode scrambler is a long piece (to get enough bendings for a good redistribution of the light) and is cumbersome.

One needs a mode scrambler as compact and easy to handle as possible (adapted to be used for experimentation set up for example) and adapted to provide an homogeneous light intensity at the output of an optical fiber inserted in the scrambler.

It is an object of the invention to provide an optical fiber mode scrambler device adapted to provide a significant mode scrambling of an optical fiber associated to it.

SUMMARY OF THE INVENTION

To this aim, the optical fiber mode scrambler is adapted to give a determined bending to an optical fiber inserted in the mode scrambler, the mode scrambler having a general extension direction, the mode scrambler having a morphology adapted to give the optical fiber a direction along X at the entry of the scrambler, and then to bend the fiber to bring the fiber substantially in the X, Y plan in the −X and Y directions, before bringing the fiber in a rotation around the X axis substantially in the Y, Z plan in the anti-clockwise direction for one full rotation, and then bending the fiber to bring the fiber substantially in the X, Y plan in the −X and −Y directions, and then bending the fiber to give the optical fiber a direction along X at the exit of the scrambler.

Such a mode scrambler creates many bendings on the optical fibers in the three dimensions, leading to a high homogeneity of the light at the output of the optical fiber. Moreover this three-dimensional device is small, space saving and easy to carry, maximizing the number of microbendings, while minimizing the length of fiber used.

In some embodiments, one might also use one or more of the following features:
- the mode scrambler comprises a central portion having a peripheral wall, a first lateral flange and a second lateral flange, the central portion being positioned between the two lateral flanges, each lateral flange comprising a plate with a first side and a second side, the second sides facing each other and facing the central portion, a cylindrical hub extending from the first side of each plate in a direction substantially perpendicular to the plate and which is parallel to the extension direction, the hub having a wall and an end opposed to the first side, the end of the hub being partially clogged with a hole, a first through bore being provided in the wall of the hub, a second through bore being provided in the plate, the second through bore being located radially outward of the plate around the hub;
- the central portion is a cylinder, with two extremities, each extremity of the cylinder being brought into contact with a second side of a plate, the central portion being mounted between the two flanges by fixing the two flanges together;
- there is an adjustable clearance for the mounting of the central portion with the two flanges adapted to tune the optical characteristics of the mode scrambler device;
- the first flange comprises several screw through bores, the second flange comprises at least the same number of screw through bores at the corresponding positions in the plan, the central portion comprising at least the same number of screw through bores in positions in the plan adapted to be aligned with the screw through bores of the first flange and of the second flange, in order that screw and nuts could be used to fix together the two flanges and the central portion;
- the first flange and the second flange are set together around the central portion by interlocking;
- the first through bore and the second through bore projected in the plan of the plate are angularly separated with respect to the hub axis by an angle comprised between 45 and 180 degrees and preferably about 90 degrees;
- the first through bore is elongated along the X direction;
- the plate of the flange is circular, the hub extending from the center of the plate, the second through bore being elongated along the circumference direction of the plate;
- the hub is closed off by a plug, the hole being open in the plug;
- the device has at least one of those features: the dimension of the diameter of the plate of the flange is between 6 cm and 8 cm, the diameter of the hub is between 1.5 cm and 2.5 cm, the hub is between 4 and 5 cm long along the X direction;
- the central portion is between 0.3 cm and 0.7 cm thick.

Another object of the invention is a system adapted to transform a Gaussian light profile in a top-hat light profile, the device comprising a mode scrambler device, an optical fiber having a proximal end and a distal end opposed to the proximal end, a laser light source adapted to deliver a Gaussian light profile, the proximal end of the optical fiber being connected to the laser in such a way that at least part of the light emitted by the laser enters the optical fiber, wherein the distal end of the fiber enters through the hole of the first flange inside the hub along the X direction, goes from the inside of the hub toward the outside of the hub through the first through bore, before being bent to be inserted in the second through bore toward the cylindrical central portion, the fiber rotating along the peripheral wall of the central portion, the fiber being bent to go through the second through bore of the second flange and then through the first through in the hub and then in the hole to exit from the hub along the X direction, the position of the second through bores being such that the optical fiber does one full turn along the wall of the cylindrical central portion.

In an embodiment, the device comprises a detector, such as a beam profiling camera connected on the optical fiber, the beam profiling camera being adapted to capture the spatial intensity profile of the laser beam at a particular plane transverse to the beam propagation path.

BRIEF DESCRIPTION OF THE DRAWINGS

Other characteristics and advantages of the invention will readily appear from the following description of one of its embodiments, provided as a non-limitative examples, and of the accompanying drawings.

On the drawings.

On the different Figures, the same reference signs designate like or similar elements.

DETAILED DESCRIPTION

Figure 1A:
FIG. 1a is a perspective view of a fiber optic bended in the mode scrambler.

The object of the invention is an optical fiber mode scrambler 1 adapted to give a determined bending to an optical fiber inserted in the mode scrambler, as illustrated on FIG. 1a.

The mode scrambler device has a general extension direction X. The direction (−X) is defined as the direction parallel and in the opposed direction to the direction X. A direction Y is a direction transverse to the direction X. A direction Z being defined in such a way that the directions X, Y and Z form a right-handed orthogonal spatial system. The direction (−Y) is the direction parallel and in the opposed direction to the direction Y. The mode scrambler has a portion with a morphology adapted to give the optical fiber a direction along X at the entry of the scrambler. The mode scrambler has another portion with a morphology adapted to bend the fiber to bring the fiber substantially in the X, Y plane in the −X and Y directions. The mode scrambler has another portion with a morphology adapted to bring the fiber in a rotation around the X axis substantially in the Y, Z plan in the anti-clockwise direction for one full rotation. The mode scrambler has another portion with a morphology adapted to bend the fiber to bring the fiber substantially in the X, Y plane in the −X and −Y directions. The mode scrambler has a final portion with a morphology adapted to bend the fiber to give the optical fiber a direction along X at the exit of the scrambler. In a specific embodiment, these portions are provided in that order along the optical fiber when the optical fiber is associated to the mode scrambler.

Figure 1B:
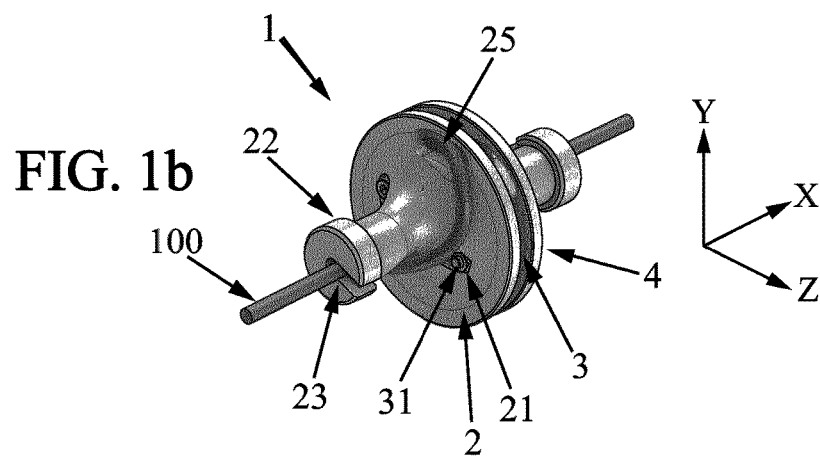
FIGS. 1b and 1c are perspective views from two different directions of a mode scrambler according to one embodiment, taken along two different perspectives.
Figure 1C:
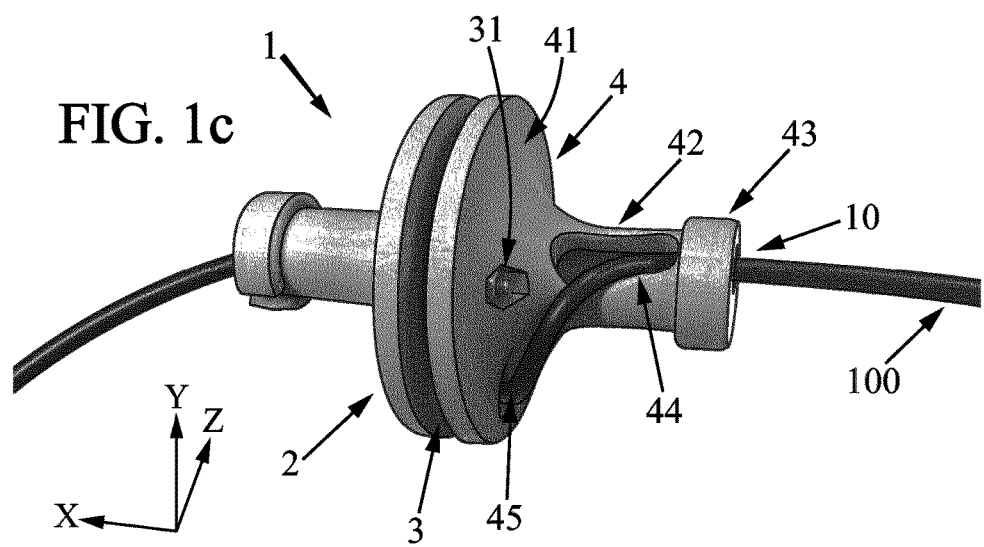

In one embodiment illustrated on FIG. 1b, the mode scrambler device comprises a cylindrical central portion 3 having a peripheral wall, a first lateral flange 2 and a second lateral flange 4, the central portion 3 being positioned between the two lateral flanges 2, 4.

Each lateral flange 2, 4 comprises a plate 21, 41 with a first side and a second side.

A cylindrical hub 22, 42 extends from the first side of each plate 21, 41 in a direction substantially perpendicular to the plate and which is parallel to the extension direction X.

Each plate 21, 41 of each flange 2, 4 could be for example circular, such as discs, the hub 22, 42 extending from the center of the plate.

For each flange, the hub is for example in one piece with the plate. The hub has a shape significantly conical, extending from the center of the first side of the plate, the hub being integral with the plate.

The central portion 3 is sandwiched between the two flanges 2, 4. The central portion 3 is for example a cylinder with a wall and two extremities.

The second sides of the plates of the flanges face each other and face the central portion 3.

Each extremity of the central portion 3 is for example in contact with the second side of the corresponding plate.

The hub 22, 42 has a wall and an end opposed to the first side. The end of the hub is partially clogged with a hole 23, 43. The hub could be closed off by a plug 26, 46, the hole 23, 43 being open in the plug 26, 46. The plug 26, 46 could for example enclose the hub at its end. In a variant the plug 26, 46 could be inserted in the hub at its end. The hole could be the extremity of a slot extending from the side of the plug toward the center of the plug. This slot could be used to insert more easily the fiber in the device, by inserting the fiber through the slot in the hole.

A first through bore 24, 44 is provided in the wall of the hub. The first through bore 24, 44 is for example elongated along the X direction.

A second through bore 25 (respectively 45) is provided in the plates 21 (respectively 41), the second through bore 25 (respectively 45) being located radially outward of the plate around the hub.

The second through bore 25, 45 could be elongated along the circumference of the plate 21, 41 in order to give the optical fiber a clearance for setting the optical fiber in the bore.

The first through bore 24, 44 and the second through bores 25, 45 projected in the plane of the plate 21, 41 are angularly separated with respect to the hub axis 22, 42 of an angle comprised in the range between 45 degrees and 180 degrees, in particular the angle could be about 90 degrees.

The position of the second through bores 25, 45 is such that the fiber optic does one full turn along the wall of the cylindrical central portion 3.

In this mode scrambler geometry, the entry and the exit are aligned.

The flanges 2, 4 are maintained with respect to each other.

Figure 2:
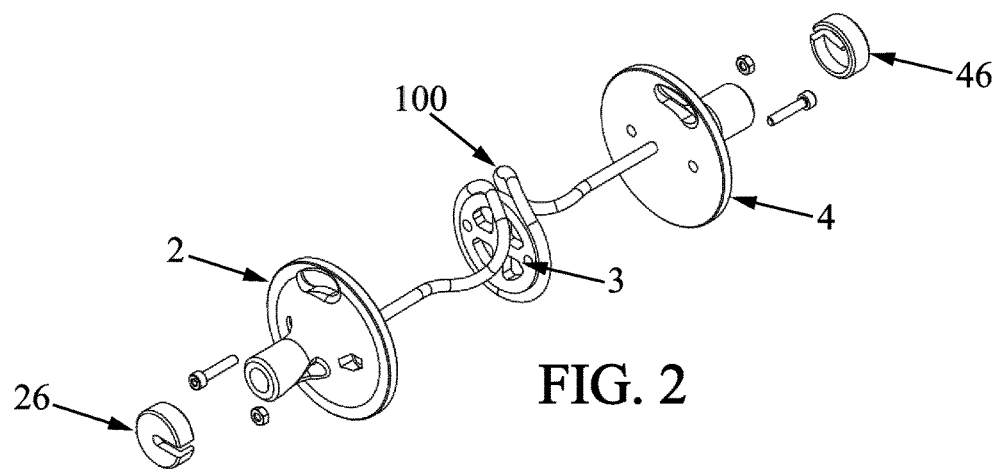
FIG. 2 is an exploded view of the mode scrambler.
Figure 3:
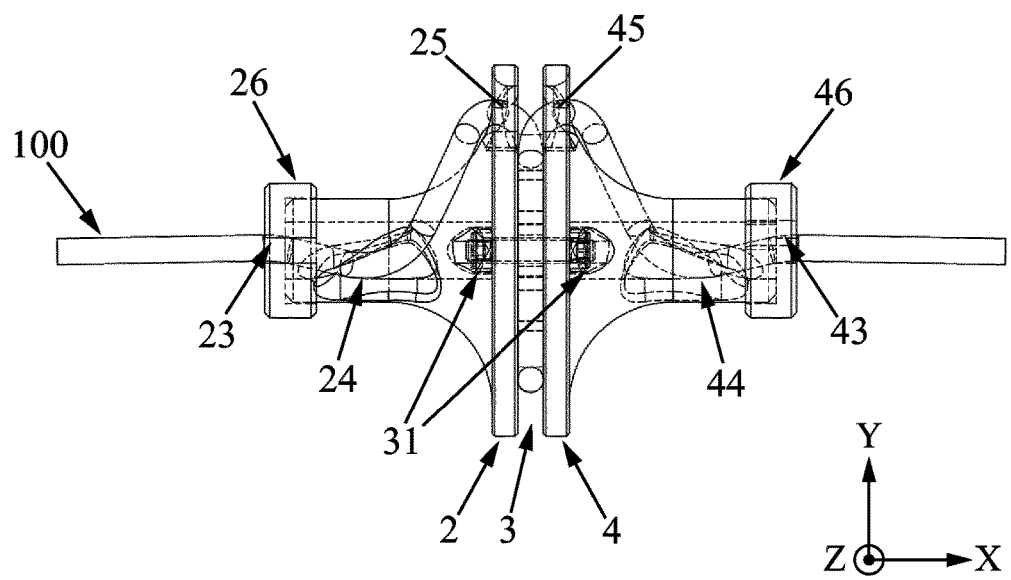
FIG. 3 is a side view of a mode scrambler.

They could be maintained together using screws and nuts as illustrated on FIG. 2 to set the mode scrambler 1 as illustrated on FIG. 3.

The first flange 2 comprises several screw through bores 31, the second flange 4 comprises at least the same number of screw through bores 31 at the corresponding positions in the plan Y, Z. The central portion 3 comprises at least the same number of screw through bores 31 in positions in the plan Y, Z adapted to be aligned with the screw through bores 31 of the first flange 2 and of the second flange 3, in order that screw and nuts could be used to fix together the two flanges 2, 4 and the central portion 3.

For example, at least two screw through bores 31 could be opened in the central portion 3, and two screw through bores could be opened in the corresponding positions in the flange 2, and two screw through bores could be opened in the corresponding positions in the flange 4. The screw through bores could be large enough that there is an adjustable clearance, i.e. the screws could have slightly different positions in the bore for the mounting of the central portion 3 with the two flanges 2, 4. The flanges 2, 4 could be moved relative to each other in the Y, Z plan to slightly modify the bending of the optical fiber 100. This adjustment could be used to tune the optical characteristics of the mode scrambler device.

In a variant the first flange 2 and the second flange 4 are set together around the central portion 3 by interlocking.

Figure 4:
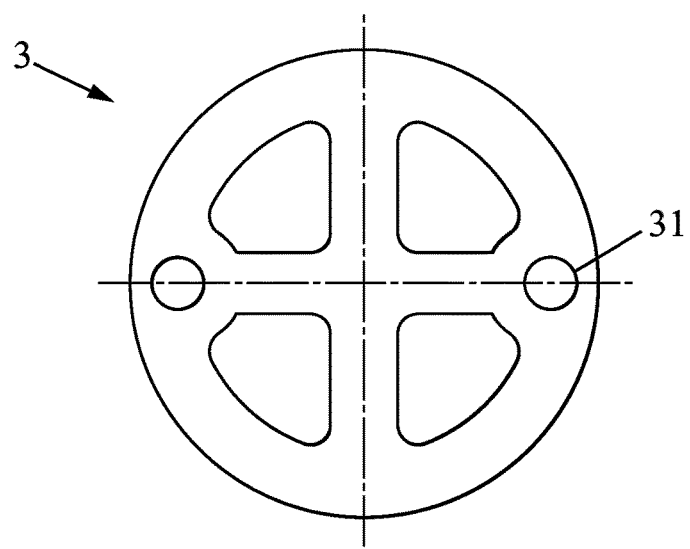
FIG. 4 is a planar front view of a central portion.

The cylindrical circular central portion 3 illustrated on FIG. 4 is between 0.3 cm and 0.7 cm thick, for example 0.45 cm thick. The screw holes 31 have for example a diameter of 5 mm. The central portion 3 could also comprise other openings for example symmetrical openings around its center.

Figure 5C:
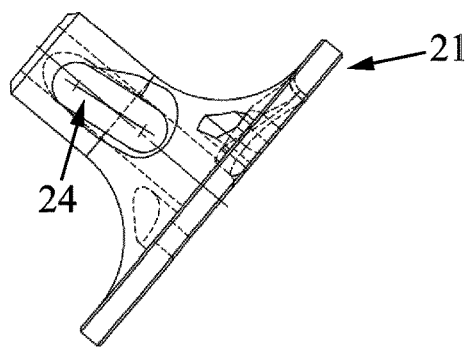
FIG. 5a, b, c are different views of a flange.
Figure 5B:
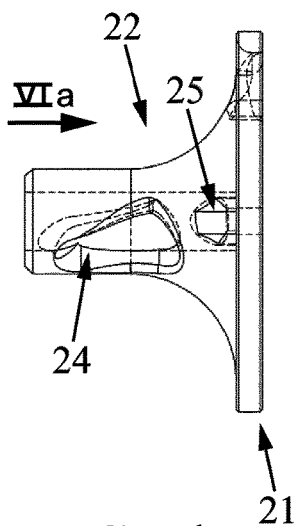
Figure 5A:
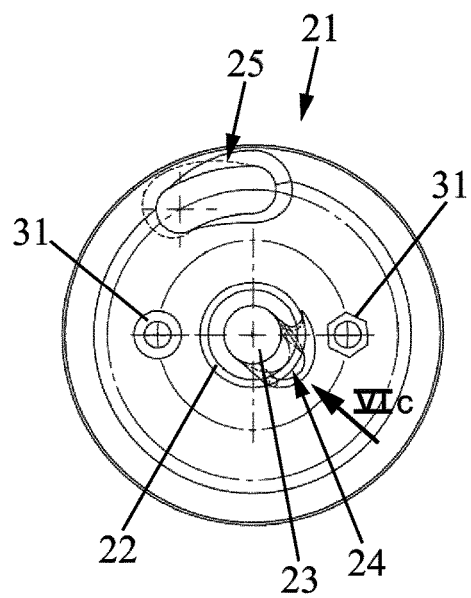

As illustrated on FIG. 5a of a flange, the plate 21 has a diameter between 6 cm and 8 cm and for example a diameter of about 7.2 cm.

The hub 22 has a diameter between 1.5 cm and 2.5 cm and for example a diameter of 2 cm, and the hub 22 is between 4 and 5 cm long along the X direction, and for example 4.5 cm long.

The second through bore 25 could be elongated in an oval shape, for example along a circle which has a diameter of 5.5 cm from the center of the plate. The hole in the closed off hub could have for example a diameter of about 1.1 cm. In the embodiment illustrated on FIG. 5b, the first through bore 24 has for example an oval shape along the X direction with an extension of 2 cm and an extension of 9 mm in the transverse direction as illustrated on FIG. 5c.

The plug 26 could be 1 cm thick and about 2.5 cm in diameter.

The light propagating through an optical fiber 100 is attenuated, an effect also known as transmission loss or energy transmission capacity, reducing the intensity of the light beam as it travels through the transmission medium. The energy transmission capacity of a fiber optic is increased by filling all available modes through which light energy (photons) propagate.

The mode scrambler 1 introduces physical bends in the optical fiber. The bends tend to couple higher-order modes (the trajectories of photons are altered). The light energy is thus redistributed in the optical fiber, more modes of the optical fiber being filled and the distribution of modes remaining stable over long distances in the fiber.

The mode scrambler of the invention allows getting reproducible and controlled bending of the fiber in the three dimensions. Increasing the number of bends and elbows given to the optical fiber, and bending in different plans in three dimensions increases the uniform distributions of photons to output a uniform intensity profile independent of the input condition.

Figure 6:
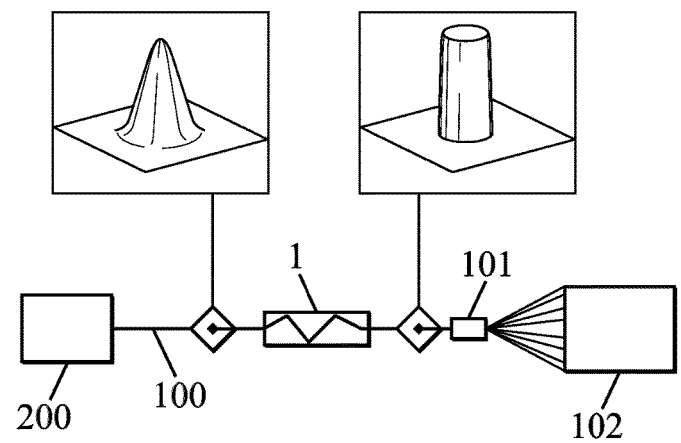
FIG. 6 is a diagram of the scrambler in a set up.

In use, as illustrated on FIG. 6, an optical fiber 100 inserted in a mode scrambler 1 is for example connected to the output of a laser light source (laser beam) 200. The optical fiber 100 has a proximal and a distal end, and the proximal end of the optical fiber is connected to the laser in such a way that at least part of the light emitted by the laser enters the optical fiber 100.

The laser beam delivers for example a Gaussian light profile and, at the distal end of the optical fiber 100, a top hat profile is obtained.

Other light profiles could be used at the input of the fiber to measure a top hat profile at the distal end of the fiber, considering that the mode scrambler provides enough bends to the fiber to provide a large modes mixing. A slight adjustment of the scrambler is yet possible.

The top hat uniform light obtained in three dimensions could be used to illuminate an output device such as a light diffuser textile 102.

The light diffuser textile could be a plain weave of optical fibres and other possibly coated textile fibres. The light travelling through the optical fibres is then emitted through scratches, pierced by mechanical indentation (toothed roll). Scratches may also be obtained by projecting particles at the cladding or by chemical treatment (solvent action to locally dissolve the cladding). These kinds of indentations are possible with the polymer optical fibres such as polymethyl methacrylate optical fibres. The light diffuser textile could also be a polymer optical fibres emitting light without indentation of the surface fibre or cladding. For instance, a light emitting panel made from one or more layers of polymer optical fibres woven into a sheet (plain weave) and coated with diffusive material in order to better diffuse laterally emitted light may be used. The plain weave structure of the fabric, in this case, enables the bends of the woven optical fibres allowing light emission laterally. The diffusive layer improves the homogeneity of light distribution. Such an illuminating panel is for example available from Lumitex Company. The light diffuser textile could be an embroidery-based light diffuser textile consists of a dense woven substrate in which polymer optical fibres are fixed using conventional yarn. The polymer optical fibres forms random bends and loops leading to macrobending of the fibre from which light can escape. Such a textile construction maybe composed of 178 polymer optical fibres (polymethyl methacrylate, diameter of 175 μm) providing a flexible diffuser about 2 mm in height and delivering a round luminous area of about 11 cm². A light diffuser textile of the invention could also be obtained by weaving. The warp could provide the skeleton of the textile whereas the weft could comprise the optical fibres. The warp preferably comprises polyester yarns whereas the weft preferably comprises polymethyl methacrylate optical fibres.

Other devices could be lightened. A connector 101 could connect the optical fiber to the output device for example for photodynamic therapy applications, or for laser based medical tools connected to optical fibers.

A detector, such as a beam profiling camera, could be connected at the output of the fiber to detect the light intensity at the output of the fiber. The beam profiler captures, displays, and records the spatial intensity profile of the laser beam at a particular plane transverse to the beam propagation path. In this case, the positions of the flanges 2, 4 relative to each other could be adjusted before setting the position function of the intensity profile detected at the distal end of the optical fiber.

The invention claimed is:

1. An optical fiber mode scrambler adapted to give a determined bending to an optical fiber inserted in the mode scrambler, the mode scrambler having a general extension direction X, the mode scrambler having a morphology adapted:
  to give the optical fiber a direction along X at the entry of the scrambler,
  and then to bend the fiber to bring the fiber substantially in the X, Y plane in the −X and Y directions,
  before bringing the fiber in a rotation around the X axis substantially in the Y, Z plane in the anti-clockwise direction for one full rotation,
  and then bending the fiber to bring the fiber substantially in the X, Y plane in the −X and −Y directions,
  and then bending the fiber to give the optical fiber a direction along X at the exit of the scrambler, the mode scrambler comprising:
  a central portion having a peripheral wall,
  a first lateral flange and a second lateral flange,
  the central portion being positioned between the two lateral flanges,
  each lateral flange comprising:
  a plate with a first side and a second side, the second sides facing each other and facing the central portion,
  a cylindrical hub extending from the first side of each plate in a direction substantially perpendicular to the plate and which is parallel to the extension direction, the hub having a wall and an end opposed to the first side, the end of the hub being partially clogged with a hole, a first through bore being provided in the wall of the hub, a second through bore being provided in the plate, the second through bore being located radially outward of the plate around the hub.

2. The mode scrambler according to claim 1, wherein the central portion is a cylinder, with two extremities, each extremity of the cylinder being brought into contact with a second side of a plate, the central portion being mounted between the two flanges by fixing the two flanges together.

3. The mode scrambler according to claim 1, wherein there is an adjustable clearance for the mounting of the central portion with the two flanges adapted to tune the optical characteristics of the mode scrambler device.

4. The mode scrambler according to claim 1, wherein the first flange comprises several screw through bores, the second flange comprises at least the same number of screw through bores at the corresponding positions in the plane, the central portion comprising at least the same number of screw through bores in positions in the plane adapted to be aligned with the screw through bores of the first flange and of the second flange, in order that screw and nuts could be used to fix together the two flanges and the central portion.

5. The mode scrambler according to claim 1, wherein the first flange and the second flange are set together around the central portion by interlocking.

6. The mode scrambler device according to claim 1, wherein the first through bore and the second through bore projected in the plane of the plate are angularly separated with respect to the hub axis by an angle comprised between 45 and 180 degrees.

7. The mode scrambler device according to claim 1, wherein the first through bore is elongated along the X direction.

8. The mode scrambler device according to claim 1, wherein the plate of the flange is circular, the hub extending from the center of the plate, the second through bore being elongated along the circumference direction of the plate.

9. The mode scrambler device according to claim 1, wherein the hub is closed off by a plug, the hole being open in the plug.

10. The mode scrambler device according to claim 1, wherein the device has at least one of the following features:
the dimension of the diameter of the plate of the flange is between 6 cm and 8 cm,
the diameter of the hub is between 1.5 cm and 2.5 cm, and the hub is between 4 and 5 cm long along the X direction.

11. The mode scrambler device according to claim 1, wherein the central portion is between 0.3 cm and 0.7 cm thick.

12. System adapted to transform a Gaussian light profile in a top-hat light profile, the system comprising:
a mode scrambler device according to claim 1,
an optical fiber having a proximal end and a distal end opposed to the proximal end,
a laser light source adapted to deliver a Gaussian light profile,
the proximal end of the optical fiber being connected to the laser in such a way that at least part of the light emitted by the laser enters the optical fiber, wherein the distal end of the fiber enters through the hole of the first flange inside the hub along the X direction, goes from the inside of the hub toward the outside of the hub through the first through bore, before being bent to be inserted in the second through bore toward the cylindrical central portion, the fiber rotating along the peripheral wall of the central portion, the fiber being bent to go through the second through bore of the second flange and then through the first through bore in the hub and then in the hole to exit from the hub along the X direction, the position of the second through bores being such that the optical fiber does one full turn along the wall of the cylindrical central portion.

13. System according to claim 12 also comprising a detector.

14. The mode scrambler device according to claim 6, wherein angle is about 90 degrees.

15. The system of claim 13, wherein the detector is a beam profiling camera connected on the optical fiber, the beam profiling camera being adapted to capture the spatial intensity profile of the laser beam at a particular plane transverse to the beam propagation path.

* * * * *